United States Patent [19]

Ohtani

[11] Patent Number: 5,432,372
[45] Date of Patent: Jul. 11, 1995

[54] SEMICONDUCTOR PRESSURE SENSOR

[75] Inventor: Keizo Ohtani, Kanagawa, Japan

[73] Assignee: Yamatake-Honeywell Co., Ltd., Tokyo, Japan

[21] Appl. No.: 178,085

[22] Filed: Jan. 6, 1994

[30] Foreign Application Priority Data

Jan. 14, 1993 [JP] Japan .................................. 5-020857
Jan. 14, 1993 [JP] Japan .................................. 5-020858

[51] Int. Cl.⁶ ........................ H01L 29/84; H01L 29/96
[52] U.S. Cl. ................................... 257/419; 257/467; 257/536; 257/627; 73/721
[58] Field of Search ............... 257/417, 418, 419, 467, 257/469, 536, 627, 628; 73/721, 719, 720

[56] References Cited

U.S. PATENT DOCUMENTS

| | | | |
|---|---|---|---|
| 4,317,126 | 2/1982 | Gragg, Jr. | 257/419 |
| 4,672,411 | 6/1987 | Shimuzu et al. | 257/419 |
| 5,170,237 | 12/1992 | Tsuda et al. | 257/419 |

FOREIGN PATENT DOCUMENTS

| | | | |
|---|---|---|---|
| 53-126880 | 11/1978 | Japan | 257/419 |
| 4-113239 | 4/1992 | Japan . | |

Primary Examiner—Sara W. Crane
Attorney, Agent, or Firm—Lane, Aitken & McCann

[57] ABSTRACT

A semiconductor pressure sensor includes a semiconductor substrate, a pressure detection gage, and a temperature detection gage. The semiconductor substrate has a thin portion formed in its central portion and a thick portion formed on an outer periphery of the thin portion. The pressure detection gage is formed on one surface of the thin portion of the semiconductor substrate and serves as a piezoelectric resistive region. The temperature detection gage is constituted by a piezoelectric resistive region formed by connecting a plurality of pairs of orthogonal minute line segments in a zigzag form. The two minute line segments of each pair are formed on a surface of the thick portion of the semiconductor substrate in crystallographic directions in which piezoelectric resistance coefficients are minimized.

8 Claims, 5 Drawing Sheets

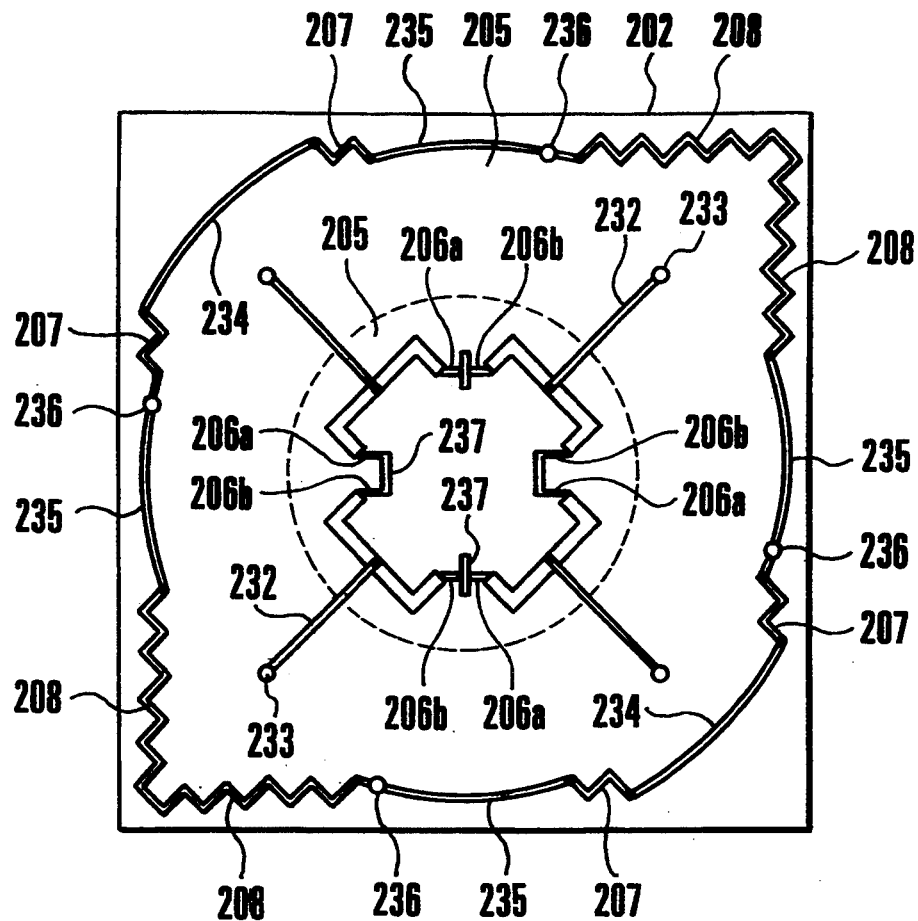
F I G. 4A
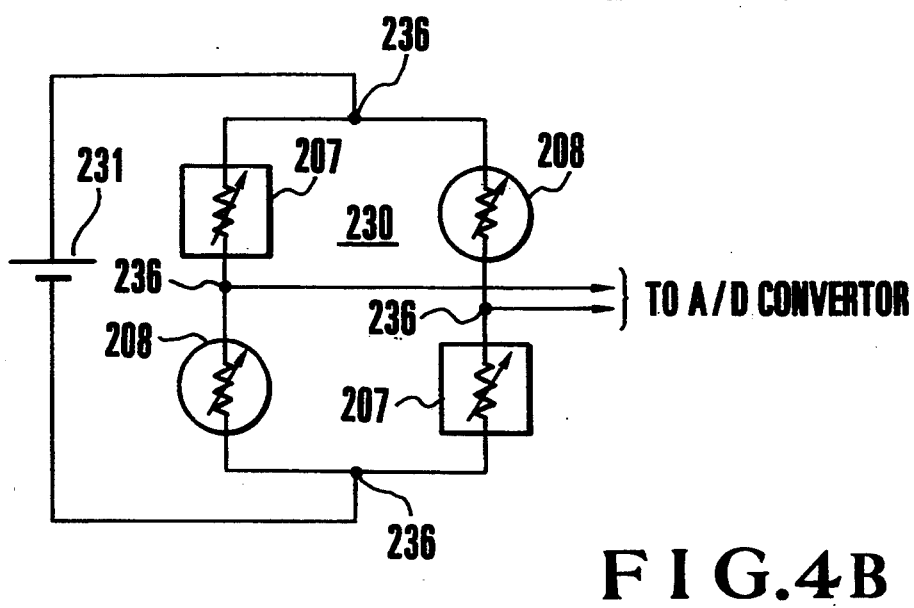
F I G. 4B

SEMICONDUCTOR PRESSURE SENSOR

BACKGROUND OF THE INVENTION

The present invention relates to a semiconductor pressure sensor for detecting a pressure difference or a pressure and, more particularly, to the layout structure of temperature detection gages.

As a conventional semiconductor pressure sensor of this type, a sensor using an Si (silicon) semiconductor diaphragm is known. This Si diaphragm type semiconductor pressure sensor is formed as follows. A gage serving as a piezoelectric region is formed on the upper surface of a semiconductor substrate by diffusion of an impurity or ion implantation. In addition, leads are formed by vapor deposition of Al or the like. Part of the lower surface of the substrate is then etched to form a thin portion having a thickness of about 20 μm to 50 μm, i.e., a diaphragm. In the pressure sensor formed in this manner, when measurement pressures are respectively applied to the upper and lower surfaces of the diaphragm, the resistivity of the gage changes upon deformation of the diaphragm. By detecting an output voltage accompanying this change in resistivity, a pressure difference or a pressure is measured.

Recently, a composite function type semiconductor pressure sensor has been known. As disclosed in Japanese Patent Laid-Open No. 4-113239, in order to prevent a shift in zero point of the sensor due to a change in temperature or static pressure, this sensor is designed to detect a static pressure and a temperature and correct a pressure difference or pressure signal by using the detection signal, thereby measuring a pressure difference or a pressure with higher precision. Especially, temperature compensation is important because the temperature dependency of piezoelectric resistance coefficients increases with a decrease in impurity concentration of a semiconductor substrate.

FIGS. 6 and 7 show such a conventional composite function type semiconductor pressure sensor. Reference numeral 1 denotes a back plate consisting of pyrex, a ceramic material, or the like which has almost the same linear expansion coefficient as that of a semiconductor substrate 2. The back plate 1 has a pressure introduction hole 3 extending through its upper and lower surfaces. The semiconductor substrate 2 is electrostatically joined to the upper surface of the back plate 1. The semiconductor substrate 2 consists of an n-type single crystal Si having a (001) plane. A recess portion 4 is formed in the lower surface of the semiconductor substrate 2 to form a thin portion which constitutes a disk-like pressure-difference-sensitive diaphragm 5. Four pressure difference detection gages 6 for detecting a pressure difference or a pressure are formed on the upper surface of the diaphragm 5 at equal angular intervals. In addition, four temperature compensation gages 8 for detecting a temperature are formed, outside the diaphragm 5, on the surface of an outer peripheral portion of the semiconductor substrate 2 at equal angular intervals. The recess portion 4 formed in the lower surface of the semiconductor substrate 2 communicates with the pressure introduction hole 3 so that one measurement pressure P1 is introduced to the pressure introduction hole 3. Each pressure difference detection gage 6 is formed by diffusion of an impurity or ion implantation and serves as a piezoelectric resistive region (piezoelectric resistive element). The four pressure difference detection gages 6 constitute a Wheatstone bridge through leads 9 formed by vapor deposition of Al or the like so as to differentially output a pressure difference signal based on measurement pressures P1 and P2 applied to the upper and lower surfaces of the diaphragm 5. The maximum measurement pressure difference and the maximum measurement pressure are about 140 kgf/cm$^2$ and 420 kgf/cm$^2$, respectively.

The piezoelectric resistance coefficients of each pressure difference detection gage 6 decrease with an increase in amount of an impurity doped into the semiconductor substrate regardless of whether the impurity is of p type or n type. For this reason, in order to increase the rate of change in resistivity of the pressure difference detection gage 6 to improve sensitivity with respect to pressure, the concentration of an impurity is set to be low. In addition, the piezoelectric resistance coefficients change depending on whether a p-type or n-type impurity is used. The piezoelectric resistance coefficients are larger when a p-type impurity is used than when an n-type impurity is used. For this reason, a p-type resistive layer is generally formed on an n-type semiconductor.

The output voltage of each pressure difference detection gage 6 changes depending on the shape and thickness of the diaphragm, the position of the pressure difference detection gage 6, the direction of the gage 6, and the like. For example, consider the direction of the pressure difference detection gage 6. If the pressure difference detection gage 6 is to be formed on Si having a (001) plane, the piezoelectric resistance coefficients are maximized in the <110> crystallographic direction. Therefore, the pressure difference detection gage 6 is preferably formed in this direction.

Similar to the pressure difference detection gages 6, the temperature compensation gages 8 are formed by diffusion of an impurity or ion implantation and serve as piezoelectric resistive regions (piezoelectric resistive elements). The temperature compensation gages 8 constitute a Wheatstone bridge through leads (not shown) formed by vapor deposition of Al or the like to output a temperature detection signal. Each temperature compensation gage 8 is formed on the surface of a thick portion 115 of the semiconductor substrate 2 in the <010> (or <100>) crystallographic direction in which the piezoelectric resistance coefficients in the (001) plane are minimized. Each temperature compensation gage 8 is formed in this direction so as not to be sensitive to the measurement pressures P1 and P2 applied to the upper and lower surfaces of the diaphragm 5.

FIG. 8 shows the distributions of piezoelectric resistance coefficients $\pi l$ and $\pi t$ of a p-type piezoelectric resistive element with respect to the (001) plane of an Si diaphragm. The piezoelectric resistance coefficients $\pi l$ and $\pi t$ are maximized in the <110> crystallographic direction and are minimized in the <010> and <100> crystallographic directions.

In the above-described conventional semiconductor pressure sensor, the temperature compensation gages 8 must be formed to be aligned with the <010> or <100> crystallographic directions, in which the piezoelectric resistance coefficients in the (001) plane are minimized, so as not to be sensitive to pressures. It is, however, difficult to form the temperature compensation gages 8 to be accurately aligned with the crystallographic direction in which the piezoelectric resistance coefficients are minimized, because of alignment errors in the formation of the gages. As is apparent from FIG. 6, if any of the temperature compensation gages 8 is shifted from the intended crystallographic direction, even slightly, the gage responds to a stress generated at the corresponding place. As a result, an error occurs in the output voltage. Consequently, a pressure difference or pressure signal based on the outputs from the pressure difference detection gages cannot be corrected with high precision.

SUMMARY OF THE INVENTION

It is an object of the present invention to provide a semiconductor pressure sensor which performs temperature compensation to correct a pressure difference or pressure signal with high precision.

It is another object of the present invention to provide a semiconductor pressure sensor in which even if a temperature detection gage is slightly shifted from a crystallographic direction in which the piezoelectric resistance coefficients are minimized, the temperature detection gage is not sensitive to an induced stress.

In order to achieve the above objects, according to the present invention, there is provided a semiconductor pressure sensor comprising a semiconductor substrate having a thin portion formed in a central portion thereof and a thick portion formed on an outer periphery of the thin portion, a pressure detection gage formed on one surface of the thin portion of the semiconductor substrate and serving as a piezoelectric resistive region, and a temperature detection gage formed from a piezoelectric resistive region formed by connecting a plurality of pairs of minute line segments in a zigzag form, the two minute line segments of each pair being formed on a surface of the thick portion of the semiconductor substrate to be perpendicular to each other in crystallographic directions in which piezoelectric resistance coefficients are minimized.

BRIEF DESCRIPTION OF THE DRAWINGS

FIG. 4A is a plan view showing a semiconductor pressure sensor according to another embodiment of the present invention;

FIG. 4B is an equivalent circuit diagram of a temperature detection portion of the sensor;

DESCRIPTION OF THE PREFERRED EMBODIMENTS

Embodiments of the present invention will be described in detail below with reference to the accompanying drawings.

Figure 1:
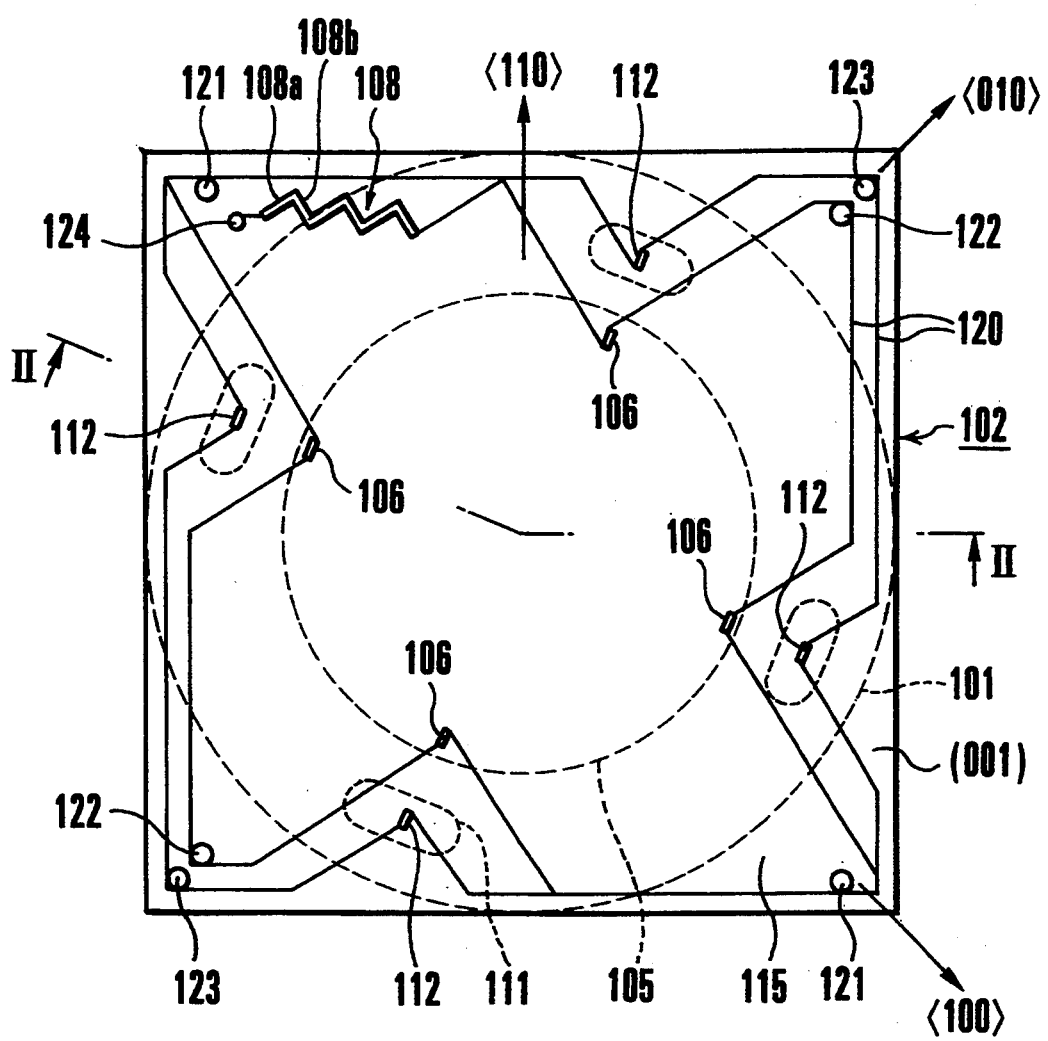
FIG. 1 is a plan view showing a semiconductor pressure sensor according to an embodiment of the present invention.
Figure 2:
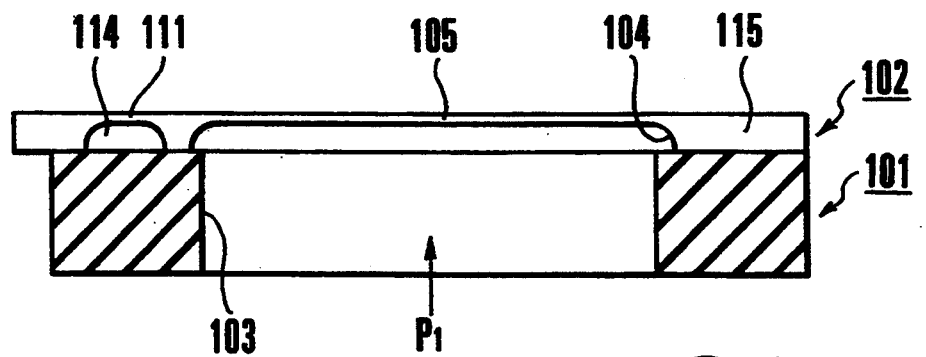
FIG. 2 is a sectional view taken along a line II—II in FIG. 1.

FIGS. 1 and 2 show a semiconductor pressure sensor according to an embodiment of the present invention. In this embodiment, the present invention is applied to a composite function type semiconductor pressure sensor designed to detect a static pressure and a temperature in addition to a pressure difference or a pressure and correct the pressure difference or pressure signal by using the static pressure and temperature detection signals, thereby measuring the pressure difference or the pressure with high precision. In the drawings, each portion is emphasized in terms of thickness and size to facilitate the understanding of the present invention, and hence the dimensions of each portion are different from actual dimensions. A back plate 101 consists of pyrex, a ceramic material, or the like which has almost the same thermal expansion coefficient as that of a semiconductor substrate 102. The semiconductor substrate 102 is electrostatically joined to the upper surface of the back plate 101. The semiconductor substrate 102 consists of an n-type single crystal Si having a (001) plane. A central portion of the lower surface of the semiconductor substrate 102 is removed by etching to form a thin disk-like pressure-sensitive diaphragm 105 for detecting a pressure difference or a pressure. The pressure-sensitive diaphragm 105 is sensitive to a pressure difference or a pressure. Four static pressure detection pressure-sensitive diaphragms 111 which are sensitive to static pressures are formed in the lower surface of the semiconductor substrate 102, outside the pressure-sensitive diaphragm 105, at equal angular intervals in the circumferential direction of the pressure-sensitive diaphragm 105, by removing the corresponding portions of the lower surface of the semiconductor substrate 102 by etching.

On the upper surface of the semiconductor substrate 102, static pressure detection gages 112 for detecting static pressures are positioned on the respective static pressure detection pressure-sensitive diaphragms 111 at equal angular intervals, and four pressure difference or pressure detection gages 106 are formed, at equal angular intervals, on the outer periphery of the pressure-sensitive diaphragm 105, at positions corresponding to the static pressure detection gages 112. A temperature compensation gage 108 for detecting a temperature is formed on the upper surface of the semiconductor substrate 102 at a position near the outer periphery of the thick portion. A pressure introduction hole 103 is formed in the center of the semiconductor substrate 102 to introduce one pressure P1 to be measured to the lower surface side of the pressure-sensitive diaphragm 105 via a recess portion 104 formed in the center of the lower surface of the semiconductor substrate 102. Upon formation of the respective static pressure detection pressure-sensitive diaphragm 111, four recess portions 114 are formed in the lower surface of the semiconductor substrate 102. These recess portions 114 are tightly covered with the back plate 101 to form reference chambers, which are held in a vacuum state or at the atmospheric pressure.

Reference numeral 120 denotes leads; 121, pressure difference/static pressure detection power supply terminal portions; 122, pressure difference signal extraction terminal portions; 123, static pressure signal extraction terminal portions; and 124, a temperature compensation power supply terminal portion. Each pressure detection gage 106 is bridge-connected between a corresponding pressure difference/static pressure detection power supply terminal portion 121 and a corresponding pressure difference signal extraction terminal portion 122 via a lead 120. Each static pressure detection gage 112 is bridge-connected between a corresponding pressure difference/static pressure detection power supply terminal portion 121 and a corresponding static pressure signal extraction terminal portion 123 via a lead 120o The temperature compensation gage 108 is connected between the temperature compensation power supply terminal portion 124 and the node between the pressure detection gage 106 and the static pressure detection gage 112.

The four pressure difference detection gages 106 are formed by diffusion or ion implantation at positions near the outer periphery of the surface of the diaphragm portion 105 at which stresses generated in the diaphragm 105 in the radial and circumferential directions upon application of a pressure difference or a pressure become maximum. These gages are connected in the form of a Wheatstone bridge to differentially output a pressure difference signal.

The static pressure detection gages 112 are respectively formed on the static pressure detection pressure-sensitive diaphragms 111 on the upper surface of the semiconductor substrate 102 so as to be located outside the pressure difference detection gages 106. The gages 112 are connected in the form of a Wheatstone bridge to differentially output a static pressure signal.

The temperature compensation gage 108 is constituted by a gage portion having a predetermined length and a resistance and serving as a piezoelectric region, which is formed on an outer peripheral portion of the upper surface of a thick portion 115 of the semiconductor substrate 102 by diffusion or ion implantation so as to be located outside the static pressure detection gage 112. In this case, the gage portion constituting the temperature compensation gage 108 is formed by connecting pairs of orthogonal minute line segments 108a and 108b in a zigzag form. The minute line segments 108a and 108b of each pair have the same length and resistance and are respectively arranged in the <010> and <100> crystallographic directions, which are perpendicular to each other and in which the piezoelectric resistance coefficients in the (001) plane are minimized. With this structure, the temperature compensation gage 108 is not sensitive to pressure.

Figure 6:
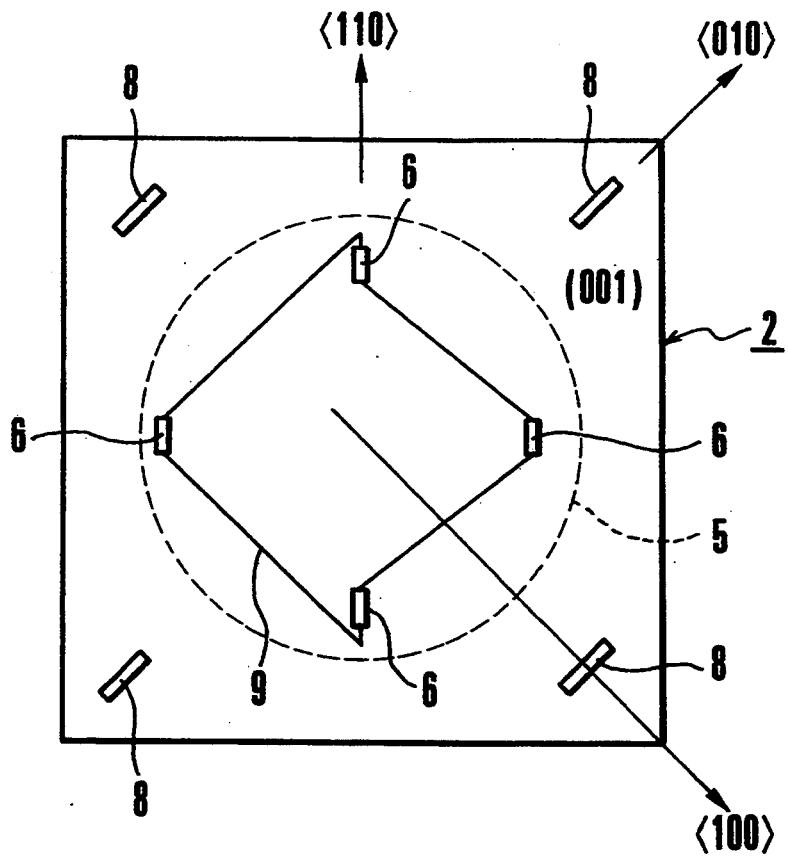
FIG. 6 is a plan view of a conventional semiconductor pressure sensor.
Figure 7:
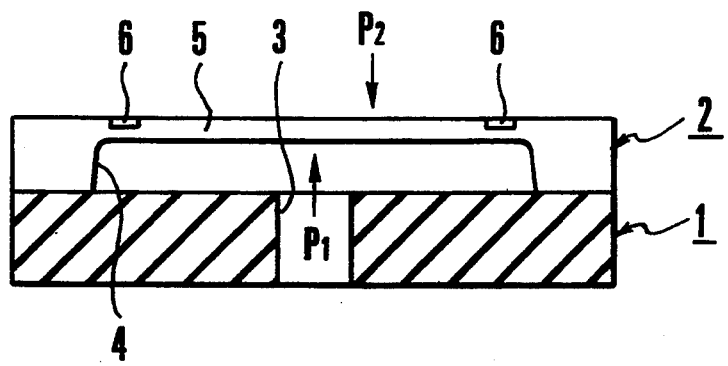
FIG. 7 is a sectional view of the conventional semiconductor pressure sensor.
Figure 8:
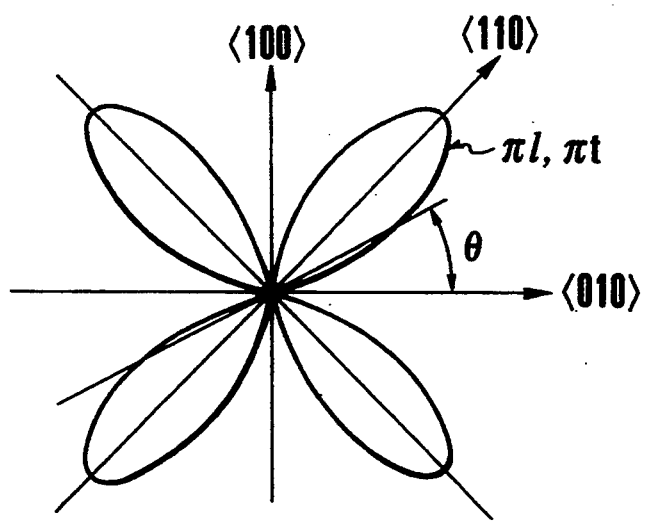
FIG. 8 is a chart showing the distributions of piezoelectric resistance coefficients $\pi l$ and $\pi t$ of a p-type piezoelectric resistive element with respect to the (001) plane of an Si diaphragm.

More specifically, as is apparent from FIG. 6, when the two orthogonal minute line segments 108a and 108b constituting the temperature compensation gage 108 are properly formed to coincide with the <010> and <100> crystallographic directions in which the piezoelectric resistance coefficients are minimized, since piezoelectric resistance coefficients $\pi 1$ and $\pi t$ are zero, no sensor output is produced even if a stress is produced. In contrast to this, if two minute line segments 108a and 108b are shifted from the <010> and <100> crystallographic directions, in which the piezoelectric resistance coefficients are minimized, by an angle $\theta$, the piezoelectric resistance coefficients $\pi 1$ and $\pi t$ do not become zero. As a result, the resistance changes in accordance with an induced stress to generate an output voltage. The temperature compensation gage is functionally connected to both the bridge circuit of the pressure difference detection gages 106 and the bridge circuit of the static pressure detection gages 112, thereby performing temperature compensation with respect to outputs from the two bridge circuits.

Letting $\Delta Ra$ and $\Delta Rb$ be the resistances of the minute line segments 108a and 108b, R be the total resistance of the gage, $\pi$ ($\pi 1$, $\pi t$) be the piezoelectric resistance coefficient, $\sigma 1$ be the stress in the <100> crystallographic direction, and $\sigma 2$ be the stress in the <010> crystallographic direction, $\Delta Ra/R$ of the minute line segment 108a is represented by:

$$\Delta Ra/R = \pi(\sigma 2 - \sigma 1), \text{ and}$$

$\Delta Rb/R$ of the minute line segment 108b is represented by:

$$\Delta Rb/R = \pi(\sigma 1 - \sigma 2)$$

Since $\Delta Ra/R$ and $\Delta Rb/R$ have opposite signs and the same absolute values, they cancel each other to produce no output. Therefore, even if the piezoelectric resistance coefficient $\pi$ is not zero, and the stress is not zero, a sensor which is not sensitive to pressure can be realized as the temperature compensation gage 108.

Figure 3A:
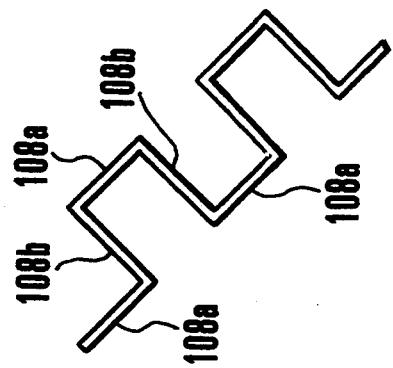
FIGS. 3A and 3B are views showing other temperature compensation gages.
Figure 3B:
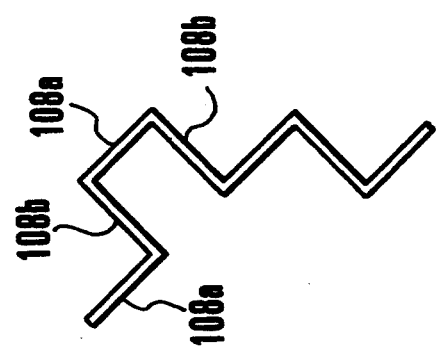

FIGS. 3A and 3B show other temperature compensation gages formed by connecting minute line segments in zigzag forms. The temperature compensation gage shown in FIG. 1 is designed such that even- and odd-numbered minute line segments 108a and 108b are respectively bent in the same directions. In contrast to this, the temperature compensation gage shown in FIG. 3A is designed such that even-numbered minute line segments 108b are bent in irregular directions. The temperature compensation gage shown in FIG. 3B is designed such that even-numbered minute line segments 108b are alternately bent in opposite directions. As described above, the minute line segments 108a and 108b can be connected in any zigzag forms as long as the two minute line segments of each pair respectively coincide with the <010> and <100> crystallographic directions, in which the piezoelectric resistance coefficients are minimized.

In the above-described embodiment, the semiconductor substrate 102 consists of n-type silicon, and the gages 106, 108, and 112 as piezoelectric regions consist of p-type silicon. This is because a piezoelectric resistive element consisting of p-type silicon has better pressure-resistance linearity than an n-type element, and forward and reverse outputs with good symmetry can be extracted in the <110> crystallographic direction in which the piezoelectric resistance coefficients in the (100) plane are maximized. It is, however, apparent that an n-type piezoelectric resistive region can be formed on a p-type region.

In addition, in the above-described embodiment, the present invention is applied to the temperature compensation gage 108. However, the present invention may be applied to a temperature detection gage.

FIG. 4A shows a semiconductor pressure sensor according to another embodiment of the present invention. FIG. 4B shows an equivalent circuit diagram of a temperature detection portion of the sensor. This embodiment uses a chip-like n-type silicon substrate 202 having a thick portion 215 serving as a stationary portion and a thin diaphragm portion 205. Pressure detection gages 206a and 206b constituted by gage resistors formed from a p-type diffusion region and having piezoelectric resistance effects are formed in predetermined regions of the thin diaphragm portion 205. An insulating film such as an SiO$_2$ film is formed on the surface of each gage. A first temperature detection gage 207 made of a lightly doped resistive layer and a second temperature detection gage 208 made of a heavily doped resistive layer are formed in the thick portion 215 on the thin diaphragm portion 205. A temperature detection bridge circuit 230 is integrally constituted by the first and second temperature detection gages 207 and 208.

Similar to the temperature compensation gate shown in FIG. 1, the first and second temperature detection gages 207 and 208 are formed by connecting a plurality of pairs of orthogonal minute line segments in zigzag forms such that the two minute line segments of each pair are respectively arranged in directions in which the piezoelectric resistance coefficients are minimized.

In this case, the first temperature detection gage 207 having a low impurity concentration is formed in the same process as that of pressure detection gages 206a and 206b. The first temperature detection gage 207 is made of a p-type diffusion layer formed by ion implantation of boron as a p-type impurity at a concentration of about $10^{16}$ cm$^{-3}$, and has, e.g., a temperature coefficient of about 3,000 ppm/°C. The second temperature detection gage 208 having a high impurity concentration is formed in the same process as that of wiring diffusion lead layers 220 for the pressure detection gages 206a and 206b. The second temperature detection gage 208 is made of a p-type diffusion layer formed by ion implantation of boron as a p-type impurity at a concentration of about $10^{18}$ cm$^{-3}$ and has, e.g., a temperature coefficient of about 1,500 ppm/°C.

Figure 5:
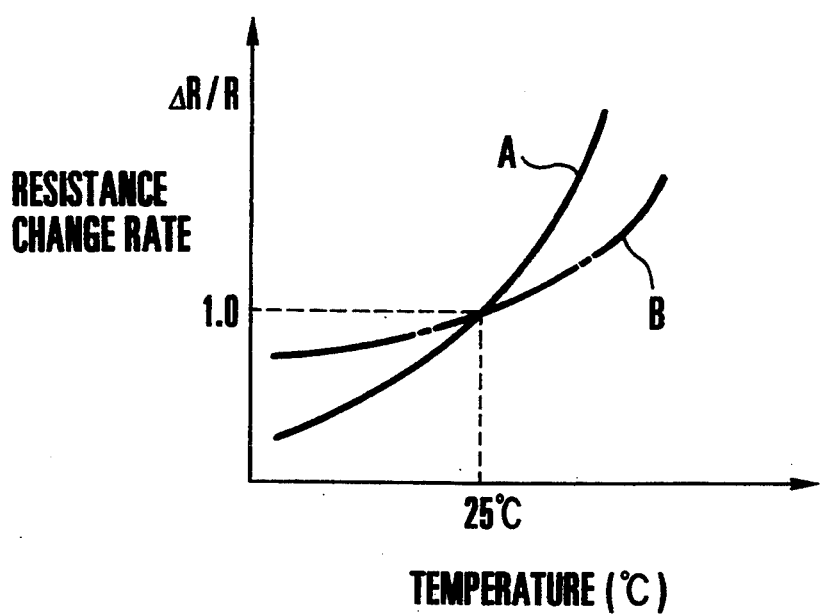
FIG. 5 is a graph showing the relationship between the resistance change rate and the temperature.

FIG. 5 shows the temperature dependencies of the resistive layers constituting these temperature detection gages. Referring to FIG. 5, a curve A indicated by the solid line represents a change in resistance with a change in temperature of the first temperature detection gage 207 when the sheet resistance is set to be 100 Ω/□, whereas a curve B indicated by the alternate long and short dashed line represents a change in resistance with a change in temperature of the second temperature detection gage 208 when the sheet resistance is set to be 1,000 Ω/□. The first and second temperature detection gages 207 and 208, which respectively exhibit small and large changes in resistance with changes in temperature, are assembled in the bridge circuit 230. When a voltage is applied from a driving power supply 231 to the bridge circuit 230, a resistance change due to changes in temperature of the first and second temperature detection gages 207 and 208 is converted into a voltage signal by the bridge circuit 230. The bridge circuit 230 then outputs a signal corresponding to the temperature to an A/D converter (not shown). At this timer the output from the bridge circuit 230 is a voltage signal which increases/decreases in level with reference to 25° C. Referring to FIG. 5, the abscissa represents the temperature (°C.); and the ordinate, a resistance change rate ΔR/R at 25° C.

Referring to FIG. 4A, reference numeral 220 denotes wiring diffusion lead layers for connecting the respective gage resistors 206a and 206b to each other; 232, Al leads for extracting the wiring diffusion lead layers 220; 233, pressure detection lead terminals; 234, Al leads for connecting the first temperature detection gages 207 to each other; 235, Al leads for connecting the first temperature detection gages 207 to the second temperature detection gages 208; 236, temperature detection lead terminals; and 237, coupling portions, each coupling the two separated pressure detection gages 206a and 206b.

According to the pressure sensor of this embodiment, a pressure can be detected by using the piezoelectric resistance effects of the respective gage resistors 206a and 206b formed on the n-type silicon substrate 202, and a temperature can also be detected by the bridge circuit 230 constituted by the first and second temperature detection gages 207 and 208 integrally formed on the n-type silicon substrate 202 and having different impurity concentrations. Therefore, a temperature signal can be transmitted, as a digital or analog signal, to a reception measuring device, upon A/D conversion, together with a pressure signal.

Since changes in resistance of the first temperature detection gages 207 and 208 integrally formed on the n-type silicon substrate 202 and having different impurity concentrations are used to detect an ambient temperature, a reduction in cost can be realized as compared with a conventional circuit in which expensive high-precision resistors, which are arranged separately from temperature detection elements on a silicon substrate, are wired. In addition, the temperature detection bridge circuit 230 on the n-type silicon substrate 202 is integrally formed. Therefore, wiring need not be performed by using leads, increasing the resistance to noise.

As has been described above, according to the semiconductor pressure sensor of the present invention, each temperature compensation piezoelectric resistive element is formed by connecting pairs of minute line segments in a zigzag form such that the two minute line segments of each pair are arranged in crystallographic directions which are perpendicular to each other and in which the respective piezoelectric resistance coefficients are minimized. For this reason, even if the temperature compensation piezoelectric resistive element is shifted from the above-mentioned crystallographic directions, the temperature sensor is not sensitive to a stress. Therefore, a pressure difference or pressure signal can be corrected with high precision.

In addition, according to the present invention, a pair of first temperature detection gages having a low impurity concentration and a pair of second temperature detection gages having a high impurity concentration are formed on the thick portion around the outer periphery of the diaphragm on the semiconductor substrate, and the temperature detection bridge circuit for detecting changes in resistance of these temperature detection gages with respect to temperature is formed on the semiconductor substrate. With this structure, a low-cost, high noise-resistance pressure sensor can be obtained.

What is claimed is:

1. A semiconductor pressure sensor comprising:
    a semiconductor substrate having a thin portion formed in a central portion thereof and a thick portion formed on an outer periphery of the thin portion;
    a pressure detection gage formed on one surface of the thin portion of said semiconductor substrate and serving as a piezoelectric resistive region; and
    a temperature detection gage constituted by a piezoelectric resistive region formed by connecting a plurality of pairs of orthogonal minute line segments in a zigzag form, the two minute line segments of each pair being formed on a surface of the thick portion of said semiconductor substrate in crystallographic directions in which piezoelectric resistance coefficients are minimized.

2. A sensor according to claim 1, wherein odd-numbered minute line segments of the minute line segments are bent in the same direction.

3. A sensor according to claim 2, wherein even-numbered minute line segments of the minute line segments are bent in the same direction.

4. A sensor according to claim 2, wherein even-numbered minute line segments of the minute line segments are alternately bent in opposite directions.

5. A sensor according to claim 2, wherein even-numbered minute line segments of the minute line segments are bent in irregular directions.

6. A semiconductor pressure sensor comprising:
a semiconductor substrate having a thin portion formed in a central portion thereof and a thick portion formed on an outer periphery of the thin portion;
a pressure detection gage formed on one surface of the thin portion of said semiconductor substrate and serving as a piezoelectric resistive region;
a pair of first temperature detection gages formed on a surface of the thick portion of said semiconductor substrate to oppose each other, each gage being constituted by a first piezoelectric resistive region having a low impurity concentration and formed by connecting a plurality of pairs of orthogonal minute line segments in a zigzag form, the minute line segments of each pair being formed in crystallographic directions in which piezoelectric resistance coefficients are minimized;
a pair of second temperature detection gages formed between said first temperature detection gages on the surface of the thick portion of said semiconductor substrate to oppose each other, each gage being constituted by a second piezoelectric resistive region having a high impurity concentration and formed by connecting a plurality of pairs of orthogonal minute line segments in a zigzag form, the minute line segments of each pair being formed in crystallographic directions in which piezoelectric resistance coefficients are minimized; and
a temperature detection circuit formed by bridge connection of said first and second temperature detection gages on said semiconductor substrate.

7. A sensor according to claim 6, wherein said first temperature detection gage is formed at the same time when said pressure detection gage is formed, and said second temperature detection gage is formed at the same time when a wiring layer of said pressure detection gage is formed.

8. A sensor according to claim 6, wherein said first temperature detection gage comprises a p-type diffusion layer having a temperature coefficient of about 3000 ppm/°C. and an impurity concentration of about $10^{16}$ cm$^{-3}$, and said second temperature detection gage comprises a p-type diffusion layer having a temperature coefficient of about 1,500 ppm/°C. and an impurity concentration of about $10^{18}$ cm$^{-3}$.

* * * * *